United States Patent
Brown et al.

(10) Patent No.: US 9,064,038 B2
(45) Date of Patent: Jun. 23, 2015

(54) METHOD AND SYSTEM FOR COMBINING MULTIPLE BENCHMARKS

(75) Inventors: Aaron B. Brown, Croton on Hudson, NY (US); Joseph L. Hellerstein, Seattle, WA (US); Tsz-Kin Lau, Richmond Hill (CA); Sam Sampson Lightstone, Toronto (CA); Carolyn Haibt Norton, Apex, NC (US); Peter K. L. Shum, Toronto (CA); William H. Tetzlaff, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 2131 days.

(21) Appl. No.: 11/511,968

(22) Filed: Aug. 29, 2006

(65) Prior Publication Data

US 2008/0127083 A1    May 29, 2008

(51) Int. Cl.
G06F 9/44    (2006.01)
G06F 11/34    (2006.01)

(52) U.S. Cl.
CPC .................................. *G06F 11/3428* (2013.01)

(58) Field of Classification Search
USPC .................................................. 717/124, 126
See application file for complete search history.

(56) References Cited

U.S. PATENT DOCUMENTS

| | | | |
|---|---|---|---|
| 5,245,638 A | | 9/1993 | Gustafson |
| 5,701,471 A * | | 12/1997 | Subramanyam ............... 717/124 |
| 7,159,021 B2 * | | 1/2007 | Boldman et al. .............. 709/223 |
| 7,177,774 B1 | | 2/2007 | Brown et al. |
| 7,373,636 B2 * | | 5/2008 | Barry et al. .................... 717/124 |
| 7,457,989 B2 * | | 11/2008 | Ulrich et al. ..................... 714/38 |
| 7,703,079 B1 * | | 4/2010 | Burrows et al. ............... 717/127 |
| 2002/0116152 A1 * | | 8/2002 | Tanaka .......................... 702/186 |
| 2003/0055956 A1 * | | 3/2003 | Arora et al. .................... 709/224 |
| 2005/0091003 A1 * | | 4/2005 | Wu ................................. 702/183 |
| 2005/0229043 A1 * | | 10/2005 | Nasuti et al. .................... 714/38 |
| 2007/0028216 A1 * | | 2/2007 | Boss et al. ..................... 717/124 |
| 2007/0028217 A1 * | | 2/2007 | Mishra et al. ................. 717/124 |

OTHER PUBLICATIONS

A.B. Brown et al., "An Approach to Benchmarking Configuration Complexity," SIGOPS, 2004, pp. 1-5.
H. Madeira et al. "Dependability Benchmarking: making choices in an n-dimensional problem space," First Workshop on Evaluating and Architecting Systems for Dependability, 2001, Goteborg, Sweden, 5 pages.

* cited by examiner

*Primary Examiner* — Hang Pan
(74) *Attorney, Agent, or Firm* — Louis J Percello; Ryan, Mason & Lewis, LLP

(57) ABSTRACT

Techniques are disclosed for combining multiple benchmarks for use in assessing characteristics of a computing system. For example, a method for configuring and running multiple benchmarks includes the following steps. A multiple benchmark specification is obtained. The multiple benchmark specification includes multiple individual benchmark specifications and a multiple benchmark workflow describing an ordering according to which the multiple individual benchmarks are to be configured and run. The multiple benchmarks are configured and run according to the ordering identified in the multiple benchmark workflow. Results of the multiple benchmark runs are recorded. One or more specifications or results associated with at least one of the multiple benchmarks are utilized as part of a benchmark specification for at least another of the multiple benchmarks so as to provide consistency between at least the one and the other of the multiple benchmarks.

19 Claims, 4 Drawing Sheets

200

400

500

METHOD AND SYSTEM FOR COMBINING MULTIPLE BENCHMARKS

FIELD OF THE INVENTION

The present invention relates generally to the quantitative measurement of computing systems and, more particularly, to assessing the functional and non-functional characteristics of computing systems.

BACKGROUND OF THE INVENTION

There is an on-going need to provide quantitative evaluations of computing systems to assess characteristics such as performance, dependability (e.g., H. Madeira and P. Koopman, "Dependability benchmarking: making choices in an n-dimensional problem space." *First Workshop on Evaluating and Architecting Systems for Dependability*, Göteborg, Sweden, 2001.), security, and configurability (e.g., A Brown and J. L. Hellerstein, "An Approach to Benchmarking Configuration Complexity, SIGOPS, 2004, or U.S. patent application Ser. No. 11/205,972, filed Aug. 17, 2005, entitled "System and Methods for Quantitatively Evaluating Complexity of Computing System Configuration").

Quantitative assessments provide statistics such as response times for performance, failure rates for dependability, intrusion probabilities for security, and configuration complexity for configurability. The statistics resulting from these evaluations are used in many ways including making decisions about hardware and software purchases and vendor internal assessments of alternative designs.

A common approach to such evaluations is to run benchmarks against production systems. For example, the Transaction Processing Council has developed a set of performance benchmarks for web, database, and other applications. U.S. Pat. No. 5,245,638 ("Method and System for Benchmarking Computers") suggests that the important elements of a benchmark are storing instructions to execute, timing benchmark runs, and storing the statistics produced.

A benchmark includes several components. The system under test (SUT) is the system being measured. Typically, the SUT consists of product level hardware and software that are assembled for the purpose of running the benchmark. There is considerable cost associated with creating a SUT for a benchmark.

The second component, the benchload generator, provides the work or disturbances needed to assess the SUT characteristics of interest. In a performance benchmark, the benchload generator is a workload generator that creates synthetic requests such as for a web server. In a dependability benchmark, the benchload consists of component failures that are induced. Considerable care is required in the construction of the benchload generator so that the work or disturbances it creates are representative, consistent, and appropriate for assessing the SUT characteristics of interest. Indeed, many external bodies such as the Transaction Processing Council and the Standard Performance Evaluation Corporation (SPEC) maintain detailed specifications for performance workload generators to ensure consistency in benchmark measurements.

Traditionally, benchmarks are configured and run in a standalone manner, and they produce a narrowly focused set of statistics about the SUT. For example, the SPECJAppServer benchmark requires a SUT consisting of a web server running on a Java Virtual Machine with appropriate programs (servlets, Enterprise Java Beans) and a database server loaded with appropriate database tables. The benchload generator creates web requests, and statistics are produced that measure the performance of the SUT in processing these requests. To provide information on the dependability of the SUT, a separate benchload generator must be used with potentially different configurations of the SUT.

SUMMARY OF THE INVENTION

Principles of the present invention provide techniques for combining multiple benchmarks for use in assessing characteristics of a computing system.

For example, in one aspect of the invention, a method for configuring and running multiple benchmarks includes the following steps. A multiple benchmark specification is obtained. The multiple benchmark specification includes multiple individual benchmark specifications and a multiple benchmark workflow describing an ordering according to which the multiple individual benchmarks are to be configured and run. The multiple benchmarks are configured and run according to the ordering identified in the multiple benchmark workflow. Results of the multiple benchmark runs are recorded. One or more specifications or results associated with at least one of the multiple benchmarks are utilized as part of a benchmark specification for at least another of the multiple benchmarks so as to provide consistency between at least the one and the other of the multiple benchmarks.

In a second aspect of the invention, a method for determining a sequence in which interrelated benchmarks are executed includes the following steps. An initial ordering of benchmarks is selected for execution based on dependencies between benchmarks. A benchmark for execution is selected if the benchmark is next in the initial ordering and its dependencies on other benchmarks remain satisfied. A benchmark is repeatedly executed until its results are acceptable, wherein adjustments are made as required.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Principles of the invention realize that there are natural relationships between benchmarks. For example, to ensure that a performance benchmark is run using a configuration that can be realized in practice, it is desirable to run a configurability benchmark before running a performance benchmark, using a common SUT to ensure the two benchmarks' results are consistent. The configurability benchmark provides a way to quantify the complexity of the configuration required to achieve the performance levels reported.

Accordingly, principles of the invention address how to run a sequence of standalone benchmarks in a way that efficiently measures a broad set of characteristics of computing systems, and how to do so in a framework that ensures that the multiple benchmark results are coordinated and self-consistent.

As will be illustratively described herein, principles of the invention provide a system and method to efficiently measure multiple characteristics of computing systems by composing standalone benchmarks.

In one illustrative system embodiment, such a multiple benchmark system includes several components:

(1) A multiple benchmark benchload generator (hereafter, MB benchload generator) that includes benchloads from multiple standalone benchmarks and common interfaces to them.

(2) An MB SUT that includes one or more SUTs, SUT components, and/or SUT configurations used in standalone benchmarks along with logic to configure and operate the SUTs.

(3) An MB Controller that provides a way to select among the standalone benchload generators and standalone SUTs.

(4) An MB benchmark specification that provides a workflow describing the sequence in which standalone benchmarks are invoked.

Furthermore, in one illustrative method embodiment, such a multiple benchmark method includes the operation of the MB Controller. Such a method includes inputting the MB specification, configuring the benchload generators and SUTs, operating the benchmark, and reporting benchmark run statistics.

It is to be appreciated that techniques that provide coordinated configuration and operation of multiple benchmarks provides several advantages. First, they allow for the consistent measurement of multiple related characteristics of computing systems, such as measuring the configurability of a system for which performance statistics are produced. Second, they provide for the re-use of benchload generators and SUTs, both of which are expensive to construct and configure.

Figure 1:
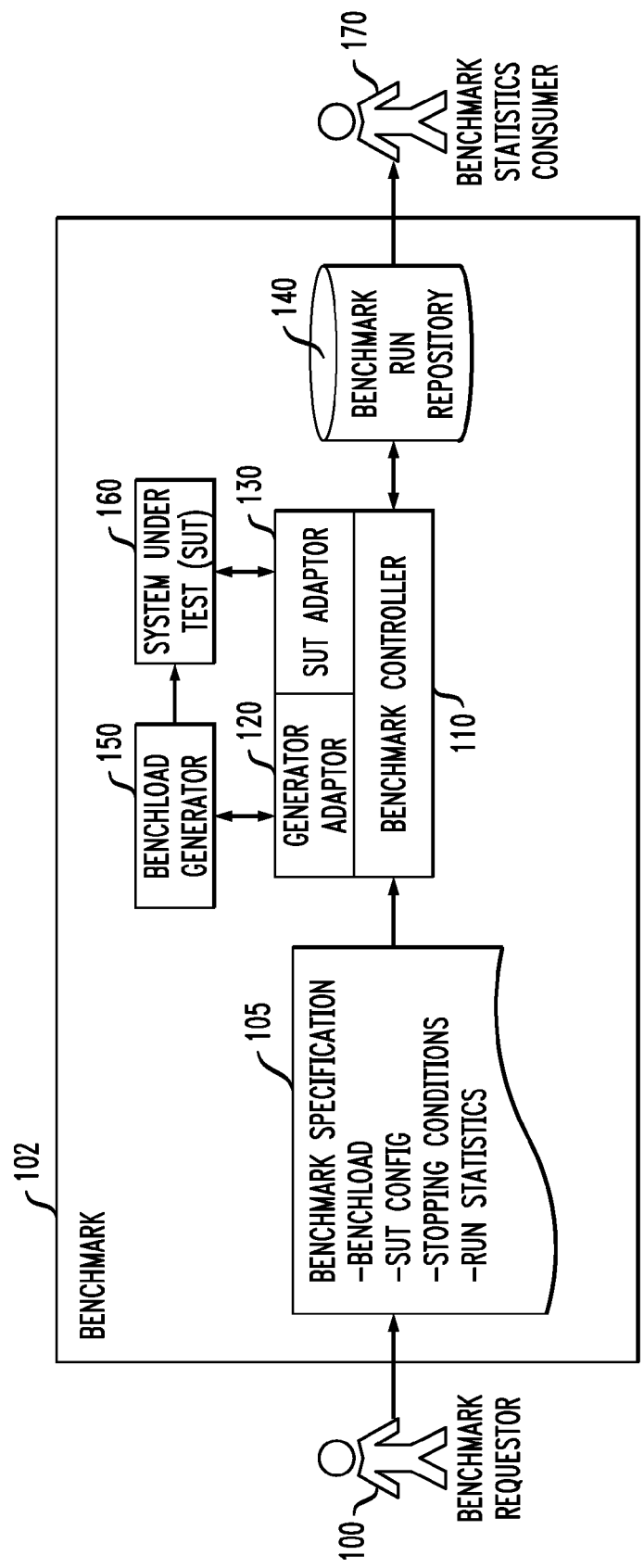
FIG. 1 illustrates elements of a standalone benchmark.

FIG. 1 illustrates standalone benchmark 100. As shown, the benchmark requestor 100 creates benchmark specification 105 that describes the benchload, SUT configuration, stopping conditions, run statistics to produce, and other aspects of operating a benchmark. Benchmark controller 110 interprets this specification and interacts with benchload generator 150 and SUT 160 through generator adaptor 120 and SUT adaptor 130, respectively, to configure and run the benchmark.

Benchmark controller 110 collects statistics during benchmark runs, possibly summarizing them, and puts them in benchmark run repository 140. Benchmark statistics consumer 170 interprets the statistics as required to make appropriate technical and business decisions. It is to be appreciated that the benchmark controller, benchmark requestor, and benchmark statistics consumer may each be either a computer program or a person.

Figure 2:
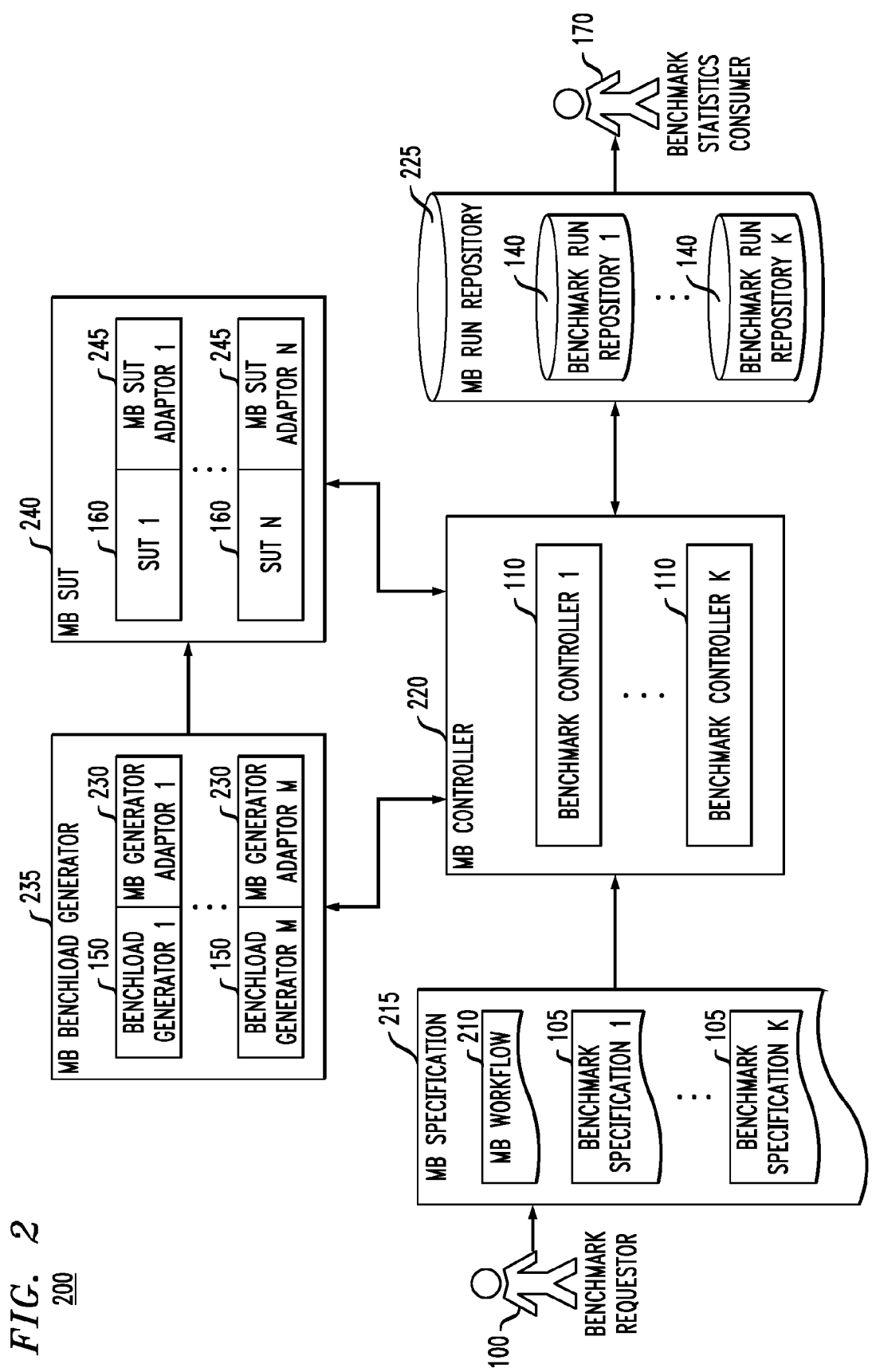
FIG. 2 illustrates a multiple benchmark system, according to an embodiment of the invention.

FIG. 2 illustrates multiple benchmark system 200, according to an embodiment of the invention. As shown, benchmark requestor 100 creates an MB (multiple benchmark) specification 215 that contains one or more benchmark specifications (105-1 through 105-K) along with an MB workflow 210 that describes the sequence in which benchmarks are to be configured and run. The MB specification is input by MB controller 220 that includes one or more benchmark controllers (110-1 through 110-K), each corresponding to a benchmark specification in the MB specification.

MB controller 220 interacts with MB benchload generator 235 and MB SUT 240 to configure and run benchmarks and to record the results of benchmark runs in MB run repository 225 that includes one or more benchmark run repositories (140-1 through 140-K). MB benchload generator 235 includes one or more benchmark generators (150-1 through 150-M) each with a corresponding MB generator adaptor (230-1 through 230-M). The MB generator adaptor has the same function as generator adaptor 120, but it provides a common interface to MB benchmark controller 220.

The MB SUT 240 includes one or more SUTs (160-1 through 160-N) and their associated MB SUT Adaptors (245-1 through 245-N). The SUTs that comprise the MB SUT may be separate SUTs, components of one or more SUTs, or multiple configurations of one or more separate SUTs or SUT components. The MB SUT adaptor exposes the same function as SUT adaptor 130, but the MB SUT adaptor 240 provides a common interface to MB controller 220. Note that there need not be a one-to-one correspondence between the benchload generators in the MB benchload generator and the SUTs in the MB SUTs. That is, the same benchload generator may be used for different SUTs, and different benchload generators may be used for the same SUT. The MB run repository 225 includes one or more benchmark run repositories (140-1 through 140-K). Note that there is a one-to-one correspondence between the benchmark controllers in the MB controller and the benchmark run repositories.

Figure 3:
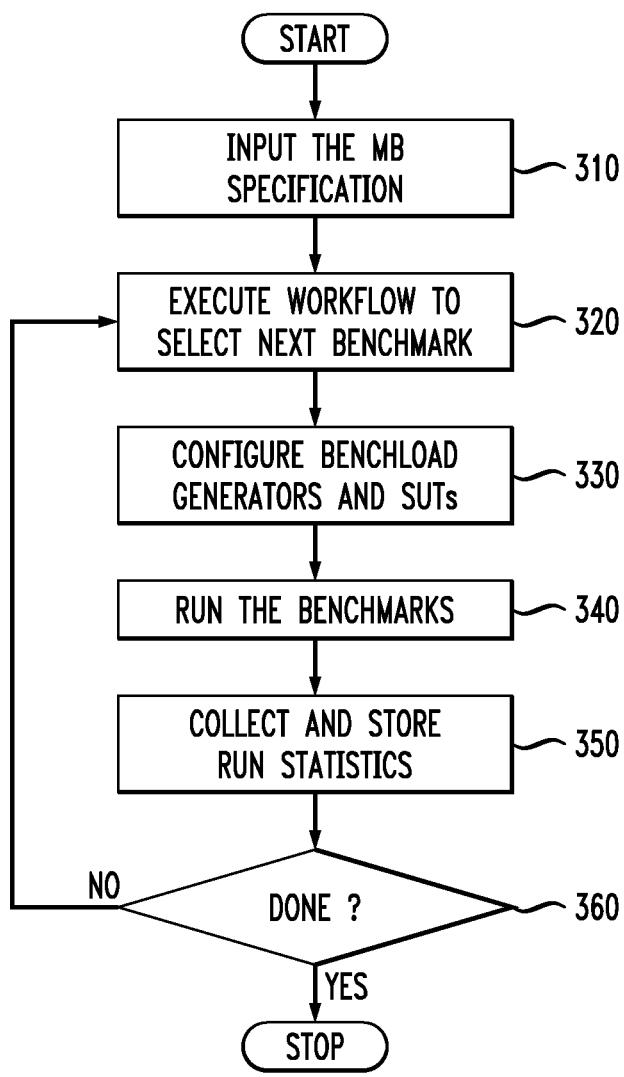
FIG. 3 illustrates a method for a multiple benchmark controller, according to an embodiment of the invention.

FIG. 3 illustrates method 300 for use by MB controller 220, according to an embodiment of the invention.

In step 310, the MB controller inputs MB specification 215.

In step 320, MB workflow 210 of MB specification 215 is executed to select the next benchmark to run, which in turn identifies a benchmark controller (110-1 through 110-K) to invoke.

In step 330, the identified benchmark controller configures the appropriate benchload generators (150-1 through 150-M) in MB benchload generator 235 making use of the associated MB generator adaptors (230-1 through 230-M). Further, the identified benchmark controller configures the appropriate SUTs (160-1 through 160-N) in MB SUT 240 making use of the associated MB SUT adaptors (245-1 through 245-N).

In step 340, MB benchmark controller 220 runs the benchmarks by interacting with the just configured benchload generators and SUTs.

In step 350, the run statistics are stored in the appropriate benchmark run repositories (140-1 through 140-K).

Step 360 illustrates that MB benchmark controller 220 may iterate through method 300 until all benchmarks have been executed.

It is to be appreciated that the MB workflow can be derived automatically if the setup constraints and/or data dependencies between benchmarks are known. In particular, it may be that the benchmark specification for one benchmark depends on information in the benchmark run repository of another benchmark. If such dependencies form a directed acyclic graph, then the MB workflow can be determined automatically.

Figure 4:
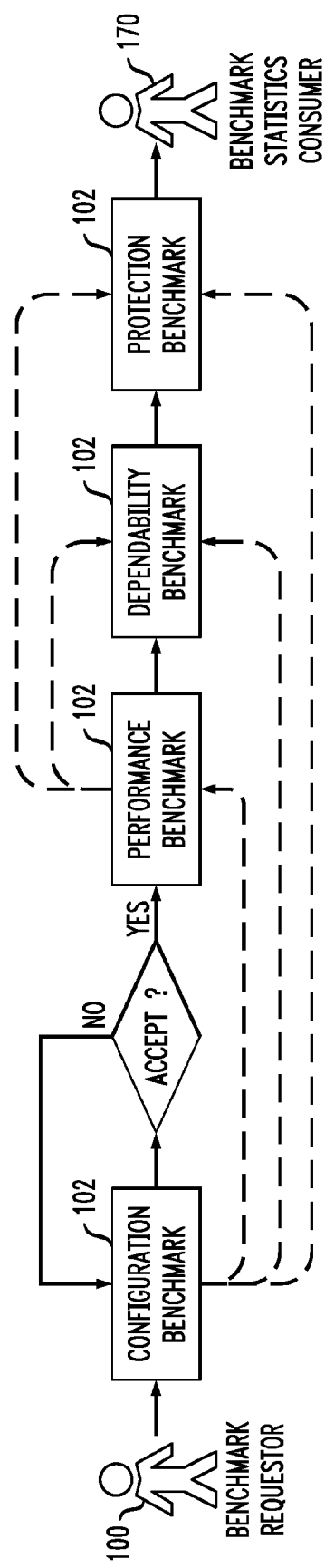
FIG. 4 illustrates a flow for a multiple benchmark including a configuration benchmark, performance benchmark, dependability benchmark, and protection benchmark, according to an embodiment of the invention.

FIG. 4 illustrates a flow 400 for a multiple benchmark including a configuration benchmark, performance benchmark, dependability benchmark, and protection benchmark, according to an embodiment of the invention. The dashed lines in this figure represent data flows that occur by using benchmark run statistics output from one benchmark as information in the benchmark specification of another benchmark.

This sequence of benchmarks is accommodated by the illustrative system and method of the invention in the following way:

(1) The MB specification for this multiple benchmark contains the benchmark specification for each benchmark, which includes the configuration benchmark, performance benchmark, dependability benchmark, and protection benchmark. Further, the workflow of the MB specification specifies the sequence in which the benchmarks are invoked, including the acceptance test.

(2) The MB controller for this multiple benchmark contains the benchmark controllers for each benchmark.

(3) The MB benchload generator for this multiple benchmark contains the benchload generators for each benchmark. Associated with each benchload generator is an MB generator adaptor that interfaces with the MB controller in a common way.

(4) The MB SUT for this multiple benchmark includes a single SUT that is used for all of the benchmarks.

(5) The MB run repository for this multiple benchmark contains the benchmark run repositories for each benchmark.

Observe that for this example in FIG. 4, the MB workflow can be obtained automatically based on the dataflow in the figure.

Accordingly, as illustratively explained herein, the MB controller inputs the MB specification, executes a workflow that selects a benchmark, configures one or more benchload generators and/or SUTs, runs one or more benchmarks, and collects and sorts run statistics. Thus, illustrative principles of the invention are able to determine the order in which interrelated benchmarks are executed whereby the method: (i) selects an initial ordering of benchmarks for execution based on the dependencies between benchmarks; (ii) selects a benchmark for execution if it is next in the initial ordering and its dependencies on other benchmarks remain satisfied; (iii) repeatedly executes a benchmark until its results are acceptable, making adjustments as required. By way of example, dependencies may include setup dependencies and/or constraint dependencies. Furthermore, a benchmark may be considered acceptable if its results satisfy specified conditions. Still further, as advantageously explained above, the setup used in one benchmark may be used to run a subsequent benchmark.

Figure 5:
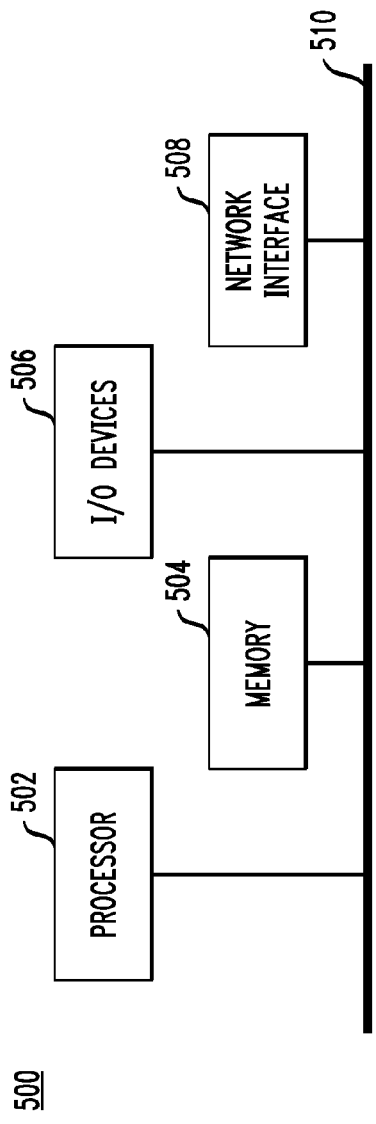
FIG. 5 illustrates a computing system for implementing a multiple benchmark system, according to an embodiment of the invention.

FIG. 5 illustrates a computing system for implementing a multiple benchmark system, according to an embodiment of the invention. That is, FIG. 5 depicts an illustrative implementation of a computer system in accordance with which one or more components/methodologies of a multiple benchmark system (e.g., components/methodologies described in the context of FIGS. 2 through 4) may be implemented. For instance, the computer system in FIG. 5 may implement the components associated with the system of FIG. 2 and implement the methodologies (e.g., FIG. 3) described herein. Also, the computer system in FIG. 5 may represent an implementation of the system under test (SUT). Still further, the computer system of FIG. 5 may represent implementations of computers used by one or more individuals associated with the environment of FIG. 2, e.g., administration staff, users, etc.

It is to be understood that such individual components/methodologies may be implemented on one such computer system, or on more than one such computer system. In the case of an implementation in a distributed computing system, the individual computer systems and/or devices may be connected via a suitable network, e.g., the Internet or World Wide Web. However, the system may be realized via private or local networks. The invention is not limited to any particular network.

As shown, computer system 500 may be implemented in accordance with a processor 502, a memory 504, I/O devices 506, and a network interface 508, coupled via a computer bus 510 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, random access memory (RAM), read only memory (ROM), a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., read only memory, fixed or removable memory) and, when ready to be utilized, loaded in part or in whole (e.g., into random access memory) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A system for configuring and running multiple benchmarks, comprising:
a memory to store program instructions, and to store an electronic document that defines a multiple benchmark specification, the multiple benchmark specification comprising (i) multiple individual benchmark specifications that define multiple individual benchmarks and define data dependencies between the multiple individual benchmarks, wherein the data dependencies specify a dependency of a specification of one individual benchmark on output results of another individual benchmark, and (ii) a multiple benchmark workflow specification that describes a sequence in which the multiple individual benchmarks are to be configured and run in a coordinated manner; and a processor coupled to the memory, operative to process the stored program instructions to instantiate a multiple benchmark controller, wherein the multiple benchmark controller comprises a plurality of individual benchmark controllers, each individual benchmark controller corresponding to one of the multiple individual benchmark specifications, wherein the multiple benchmark controller is operative to:

obtain the electronic document that defines the multiple benchmark specification;

automatically configure and run the multiple individual benchmarks according to both the sequence specified in the multiple benchmark workflow specification and the defined data dependencies between the multiple individual benchmarks;

record output results of the multiple individual benchmark runs, and utilize the recorded output results associated with at least a first one of the multiple individual benchmarks as part of a specification for at least a second one of the multiple individual benchmarks to be run after the first one of the multiple individual benchmarks is run, so as to provide consistency between at least the first one and second one of the multiple individual benchmarks.

2. The system of claim 1, wherein the processor is operative to process the stored program instructions to further instantiate a multiple benchload generator operative to provide one or more benchloads to the multiple benchmark controller.

3. The system of claim 2, wherein the multiple benchload generator comprises one or more benchload generators each with an adaptor to provide a common interface to the multiple benchmark controller.

4. The system of claim 1, further comprising multiple systems under test.

5. The system of claim 4, wherein the multiple systems under test each have an adaptor associated therewith to provide a common interface to the multiple benchmark controller.

6. The system of claim 1, further comprising a multiple benchmark run repository in which the output results of one or more of the multiple individual benchmarks are recorded by the multiple benchmark controller.

7. The system of claim 6, wherein the multiple benchmark run repository further comprises multiple benchmark run repositories corresponding to the multiple benchmarks.

8. A method for configuring and running multiple benchmarks, comprising the steps of:

obtaining an electronic document that defines a multiple benchmark specification, the multiple benchmark specification comprising (i) multiple individual benchmark specifications that define multiple individual benchmarks and define data dependencies between the multiple individual benchmarks, wherein the data dependencies specify a dependency of a specification of one individual benchmark on output results of another individual benchmark, and (ii) a multiple benchmark workflow specification that describes a sequence in which the multiple individual benchmarks are to be configured and run in a coordinated manner; and instantiating a multiple benchmark controller, wherein the multiple benchmark controller comprises a plurality of individual benchmark controllers, each individual benchmark controller corresponding to one of the multiple individual benchmark specifications, wherein the multiple benchmark controller is configured for:

automatically configuring and running the multiple individual benchmarks according to both the sequence specified in the multiple benchmark workflow specification and the defined dependencies between the multiple individual benchmarks;

recording output results of the multiple individual benchmark runs, and utilizing the recorded output results associated with at least a first one of the multiple individual benchmarks as part of a specification for at least a second one of the multiple individual benchmarks to be run after the first one of the multiple individual benchmarks is run, so as to provide consistency between at least the first one and second one of the multiple individual benchmarks, wherein the steps of obtaining, instantiating, automatically configuring, recording and utilizing are computer-implemented steps that are performed by a computer.

9. The method of claim 8, further comprising implementing a multiple benchload generator which is configured to provide one or more benchloads to the multiple benchmark controller.

10. The method of claim 9, wherein the multiple benchload generator comprises one or more benchload generators each with an adaptor to provide a common interface to the multiple benchmark controller.

11. The method of claim 8, further comprising implementing multiple system-under-test adaptors to provide a common interface to the multiple benchmark controller.

12. The method of claim 8, further comprising implementing a multiple benchmark run repository in which the output results of one or more of the multiple individual benchmarks are recorded.

13. The method of claim 12, wherein the multiple benchmark run repository further comprises multiple benchmark run repositories corresponding to the multiple benchmarks.

14. An article of manufacture for configuring and running multiple benchmarks, wherein the article of manufacture comprises a non-transitory machine readable storage medium comprising one or more programs stored thereon which when executed implement the steps of:

obtaining an electronic document that defines a multiple benchmark specification, the multiple benchmark specification comprising (i) multiple individual benchmark specifications that define multiple individual benchmarks and define data dependencies between the multiple individual benchmarks, wherein the data dependencies specify a dependency of a specification of one individual benchmark on output results of another individual benchmark, and (ii) a multiple benchmark workflow specification that describes a sequence in which the multiple individual benchmarks are to be configured and run in a coordinated manner; and instantiating a multiple benchmark controller, wherein the multiple benchmark controller comprises a plurality of individual benchmark controllers, each individual benchmark controller corresponding to one of the multiple individual benchmark specifications, wherein the multiple benchmark controller is configured for:

automatically configuring and running the multiple individual benchmarks according to both the sequence specified in the multiple benchmark workflow specification and the defined dependencies between the multiple individual benchmarks recording output results of the multiple individual benchmark runs, and utilizing the recorded output results associated with at least a first one of the multiple individual benchmarks as part of a specification for at least a second one of the multiple individual benchmarks to be run after the first one of the multiple individual benchmarks is run, so as to provide consistency between at least the first one and second one of the multiple individual benchmarks.

15. The article of claim 14, wherein the one or more programs when executed implement a multiple benchload generator operative to provide one or more benchloads to the multiple benchmark controller.

16. The article of claim 15, wherein the multiple benchload generator further comprises one or more benchload generators each with an adaptor to provide a common interface to the multiple benchmark controller.

17. The article of claim 14, wherein the one or more programs when executed implement multiple system-under-test adaptors to provide a common interface to the multiple benchmark controller.

18. The article of claim 14, wherein the one or more programs when executed implement a multiple benchmark run repository in which the output results of one or more of the multiple individual benchmarks are recorded.

19. The article of claim 18, wherein the multiple benchmark run repository further comprises multiple benchmark run repositories corresponding to the multiple benchmarks.

* * * * *